(12) United States Patent
Hanes

(10) Patent No.: US 10,477,318 B2
(45) Date of Patent: Nov. 12, 2019

(54) WAKE SIGNAL FROM A PORTABLE TRANSCEIVER UNIT

(71) Applicant: HEWLETT-PACKARD DEVELOPMENT COMPANY, L.P., Houston, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/087,267

(22) PCT Filed: Mar. 21, 2016

(86) PCT No.: PCT/US2016/023481
§ 371 (c)(1),
(2) Date: Sep. 21, 2018

(87) PCT Pub. No.: WO2017/164840
PCT Pub. Date: Sep. 28, 2017

(65) Prior Publication Data
US 2019/0104365 A1 Apr. 4, 2019

(51) Int. Cl.
*H04R 5/04* (2006.01)
*H04B 1/38* (2015.01)
(Continued)

(52) U.S. Cl.
CPC .............. *H04R 5/04* (2013.01); *G06F 3/017* (2013.01); *G10L 15/28* (2013.01); *H04B 1/38* (2013.01);
(Continued)

(58) Field of Classification Search
CPC .... H04R 5/04; H04R 29/007; H04R 2420/07; H04B 1/3833; G06F 3/017; G10L 15/28
See application file for complete search history.

(56) References Cited

U.S. PATENT DOCUMENTS 6,446,138 B1 9/2002 Criscolo et al.
8,078,768 B2 12/2011 Manor et al.
(Continued)

FOREIGN PATENT DOCUMENTS

KR 1020110008608 1/2011

OTHER PUBLICATIONS

Dragon Tutorial, "iPhone: Using an iPhone as a WiFi Microphone", http://www.nuance.com/landing-pages/dragon/dns-tutorial/enx/scx/professional/dictation/ip.
(Continued)

*Primary Examiner* — Regina N Holder
(74) *Attorney, Agent, or Firm* — HP Inc. Patent Department

(57) ABSTRACT

A method includes, with a portable, wireless transceiver, detecting a predetermined motion pattern of the transceiver; and in response to detecting the predetermined motion pattern of the transceiver, transmitting a wireless wake signal from the portable transceiver to a sleeping computer. A corresponding portable transceiver unit includes: a microphone to receive spoken voice commands from a user; a wireless transceiver to wirelessly communicate with a separate computer; and a motion sensor to detect a predetermined motion pattern at the portable transceiver unit. The wireless transceiver, in response to the motion sensor detecting the predetermined motion pattern of the transceiver, wirelessly transmits a wake signal to the computer.

20 Claims, 5 Drawing Sheets

(51) Int. Cl.
*H04B 1/3888* (2015.01)
*H04R 29/00* (2006.01)
*G06F 3/01* (2006.01)
*G10L 15/28* (2013.01)
*H04B 1/3827* (2015.01)

(52) U.S. Cl.
CPC ......... *H04B 1/3833* (2013.01); *H04B 1/3888* (2013.01); *H04R 29/007* (2013.01); *H04R 2201/028* (2013.01); *H04R 2420/05* (2013.01); *H04R 2420/07* (2013.01)

(56) References Cited

U.S. PATENT DOCUMENTS

| | | |
|---|---|---|
| 9,250,685 B2 | 2/2016 | O'Malley et al. |
| 2009/0298420 A1 | 12/2009 | Haartsen et al. |
| 2012/0297226 A1 | 11/2012 | Mucignat et al. |
| 2013/0035049 A1 | 2/2013 | Smit |
| 2013/0212413 A1 | 8/2013 | Berndt et al. |
| 2015/0095465 A1 | 4/2015 | Yeh |
| 2015/0334477 A1* | 11/2015 | Macours .................. G08B 3/10 381/150 |

OTHER PUBLICATIONS

Hoflinger, F., et al., "Smartphone remote control for home automation applications based on acoustic wake-up receivers", Instrumentation and Measurement Technology Conference (I2MTC) Proceedings 2014 IEEE International May 12 15, 2014 2 pages.

* cited by examiner

WAKE SIGNAL FROM A PORTABLE TRANSCEIVER UNIT

BACKGROUND

Portable wireless speakers allow a user to connect wirelessly to a source of audio data, such as a computer. The user can then take the speaker unit to other rooms within a home or office, for example, while streaming music from the stationary store of audio data.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
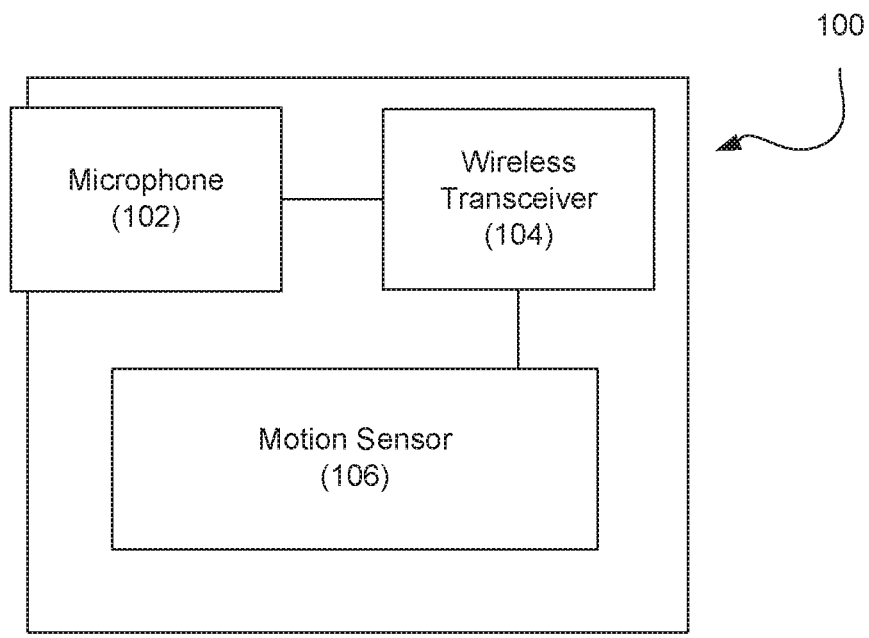
FIG. 1 is an illustration of an example portable transceiver unit consistent with the disclosed implementations.

The Internet provides a tremendous wealth of information that can be searched and browsed using internet search engines. Additionally, users may keep significant personal information online such as a personal or business calendar, list of contacts and social connections, etc. With such information being stored on the Internet, it can be accessed by the user from a variety of devices, such as a personal computer or a smart phone.

To help manage all of this information and functionality, various personal assistant applications are becoming popular. Examples of such personal assistant applications include Siri® from Apple, Inc, OK Google® from Google, Inc. and Cortana® from Microsoft Corporation.

A principal feature of these personal assistant applications is the ability of the user to give voice commands. The personal assistant application will process the audio of the spoken command with speech recognition and take action accordingly.

For example, the user may ask a question using natural language. The question may cause the personal assistant application to execute an Internet search for the answer. Alternatively, the question might be about the user's schedule, causing the personal assistant application to retrieve an answer from the user's electronic calendar.

Frequently, the personal assistant application will provide a verbal response to the user's vocal input. For example, the personal assistant application may verbally state the answer to the question the user has asked.

Because of the convenience of such verbal interfacing, personal assistant applications are particularly popular on mobile devices, such as smart phones, where a full size keyboard, monitor and other such user input devices are not available. However, personal assistant applications are also widely used on larger computers, such as laptop and desktop computers, which are stationary or less portable than a smart phone.

As noted above, portable wireless speaker units allow a user to connect wirelessly to a source of audio data, such as a computer. The user can then take the speaker unit to other rooms within a home or office, for example, while streaming music from the stationary store of audio data.

The present specification proposes a portable transceiver unit to allow a user to remotely access, for example, a personal assistant application that is running on a computer with which the portable transceiver unit is in wireless communication. This computer may be, for example, a laptop, a larger personal computer or even a server that is generally stationary where the user may want to access the personal assistant application on that computer from a remote location and can now do so with the portable transceiver unit described here.

This portable transceiver unit includes one or more microphones into which the user can issue a voice command. The portable transceiver unit then transmits the voice command to its host computer and the personal assistant application executing thereon. The personal assistant application then processes the voice command and transmits a response to the portable transceiver unit.

The portable transceiver unit may incorporate a speaker or system of speakers. The portable transceiver unit may use its speaker to output a verbal response from the personal assistant application. Additionally, the portable transceiver unit with speakers may also serve as a portable speaker unit with which a user can wirelessly stream audio from the host computer supporting the portable unit. Alternatively, the functionality of the portable transceiver unit described here could be added to a unit previously purposed only as a portable speaker unit.

However, if the supporting host computer has entered a low-power mode, such as a sleep mode, the host computer will be unable to receive the voice command from the portable transceiver unit for the personal assistant application. Accordingly, the present specification also proposes the capability of the portable transceiver unit to transmit a wake signal, on demand, to the supporting host computer. For example, this wake signal may be triggered by the user moving or performing a predetermined motion pattern at the portable transceiver unit.

Thus, in one example, the present specification describes a portable transceiver unit including: a microphone to receive spoken voice commands from a user; a wireless transceiver to wirelessly communicate with a separate computer; and a motion sensor to detect a predetermined motion pattern at the portable transceiver unit. The wireless transceiver, in response to the motion sensor detecting the predetermined motion pattern of the transceiver, will wirelessly transmit a wake signal to the computer.

In another example, the present specification describes a method including: with a portable, wireless transceiver, detecting a predetermined motion pattern of the transceiver; and in response to detecting the predetermined motion pattern of the transceiver, transmitting a wireless wake signal from the portable transceiver to a sleeping computer.

In another example, the present specification describes a remote communication system for a computer, the system including: a dongle for connection to a host computer; and a portable transceiver unit, the portable transceiver unit including: a microphone to receive spoken voice commands from a user; a wireless transceiver to wirelessly communicate with the dongle at the host computer; and a motion sensor to detect a predetermined motion pattern at the portable transceiver unit. The wireless transceiver, in response to the motion sensor detecting the predetermined motion pattern of the transceiver, will wirelessly transmit a wake signal to the dongle at the computer.

As used herein and in the following claims, the term "portable transceiver unit" will refer to a portable unit for wirelessly interfacing and communicating with a separate host computer such that a user can operate the portable transceiver unit to both send and receive data to and from the host computer from a location removed from the actual location of the computer itself within range of the wireless communication between the portable transceiver unit and the host computer.

As used herein and in the following claims, the term "host computer" or "computer" will refer to a computer for interfacing with the portable transceiver unit, sending and receiving signals to and from the portable transceiver unit. The host computer or computer could be any computerized device capable of supporting the portable transceiver unit including, but not limited to, a laptop computer, notebook computer, tablet computer, personal computer, desktop computer or server.

As used herein and in the following claims, the term "predetermined motion pattern" refers to a specific motion occurring at the portable transceiver unit that has been designated as the trigger for transmitting a wake signal to the transceiver's host computer. This motion pattern may include, for example, tapping, shaking, tipping or rotating the portable transceiver unit.

As used herein and in the following claims, the term "dongle" refers to a self-contained unit for connection to a host computer. The dongle providing additional functionality to the host computer, such as an interface with a portable transceiver unit.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

FIG. 1 is an illustration of an example portable transceiver unit consistent with the disclosed implementations. As shown in FIG. 1, the portable transceiver unit (100) includes a microphone (102), a wireless transceiver (104) and a motion sensor (106). The microphone (102) may be a single microphone or may be multiple microphones located at different locations on the portable transceiver unit (100). Multiple microphones on the portable transceiver unit (100) may provide better directional coverage.

With the microphone (102), the portable transceiver unit (100) can receive a voice command from a user. This voice command may be a voice command established for invoking a response on a host computer supporting the portable transceiver unit (100). More specifically, the voice command may be input for a personal assistant application executing on the supporting host computer.

The voice command, after being transduced by the microphone (102), is provided to the wireless transceiver (104). The wireless transceiver (104) wirelessly transmits the data of the voice command to the supporting host computer.

However, as noted above, if the host computer has entered a low-power state, such as a sleep state, the host computer will not process the command from the portable transceiver unit (100). Accordingly, the portable transceiver unit (100) may need to first send a wake signal to the host computer to wake the host computer from the low-power state.

Thus, the portable transceiver unit (100) includes a motion sensor (106). This motion sensor (106) could be, for example, a Microelectronic Mechanical System (MEMS) motion sensor, accelerometer or gyroscope.

Motion occurring at the portable transceiver unit (100) is thus detected by the motion sensor (106). If this motion exhibits a predetermined pattern, that expected pattern is recognized by the motion sensor (106). The motion sensor (106) accordingly signals the wireless transceiver (104) of detection of the predetermined motion pattern. The wireless transceiver (104) responds by transmitting a wake signal to the host computer. The host computer then wakes in response and can receive a subsequent command from the portable transceiver unit (100).

If the command is addressed to a personal assistant application, the host computer will process the command with the personal assistant application. A word or phrase stated at the beginning of the command can designate the command or inquiry as being intended for a particular personal assistant application.

In some cases, the personal assistant application may be integrated with or interfaced to the host computer's operating system. Thus, when the computer wakes, the personal assistant application will be available through the operating system.

In other examples, the portable transceiver unit (100) may be used to send a command to launch the personal assistant application that is not presently available. The personal assistant application could be launched in response to a voice command made by the user at the portable transceiver unit (100) and transmitted to the host computer. Alternatively, the personal assistant application could be launched in response to a motion pattern occurring at the portable transceiver unit (100), similar to triggering a wake signal as described herein. This motion pattern to signal a command to launch a personal assistant application could be a different motion pattern than was used to wake the host computer or the same motion pattern made when the host computer is already awake.

Examples of motion patterns that can be used including, but are not limited to, shaking the portable transceiver unit (100), for example side to side; tapping on the portable transceiver unit (100) to induce vibrations detectable to the motion sensor (106); rotating the portable transceiver unit (100); and tipping the portable transceiver unit (100). These motion patterns will be described in further detail below.

Figure 2:
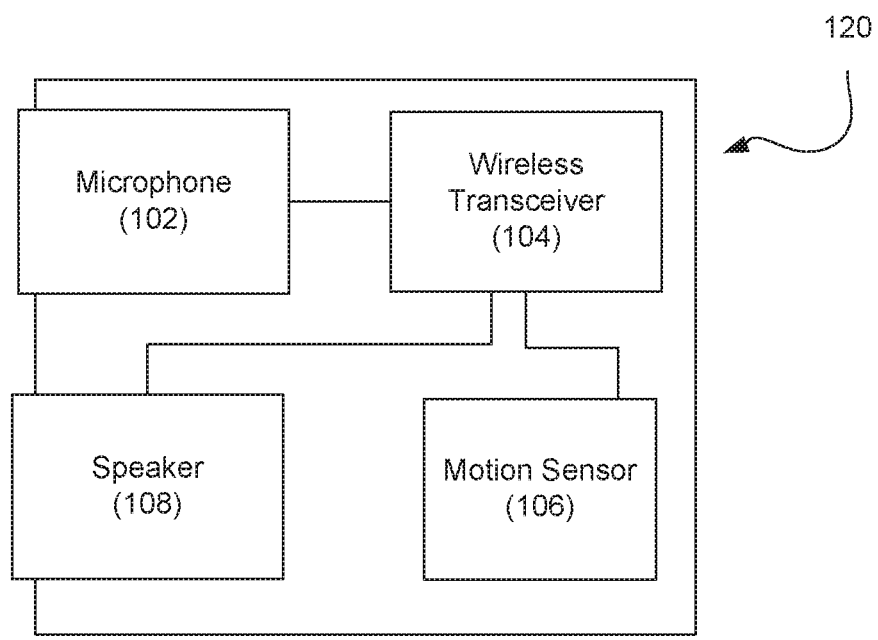
FIG. 2 is another illustration of an example portable transceiver unit consistent with the disclosed implementations.

FIG. 2 is another illustration of an example portable transceiver unit consistent with the disclosed implementations. A shown in FIG. 2, the portable transceiver unit (120) also includes a microphone (102) wireless transceiver (104) and motion sensor (106), as described above.

Additionally, the portable transceiver unit (120) includes a speaker (108). This may be a system of any number of different speakers. The speaker (108) may be a high fidelity speaker and occupy the majority of the bulk of the portable transceiver unit (120). Consequently, the portable transceiver unit (120) can be used additionally or primarily as a portable speaker unit to stream audio from the host computer.

Figure 3:
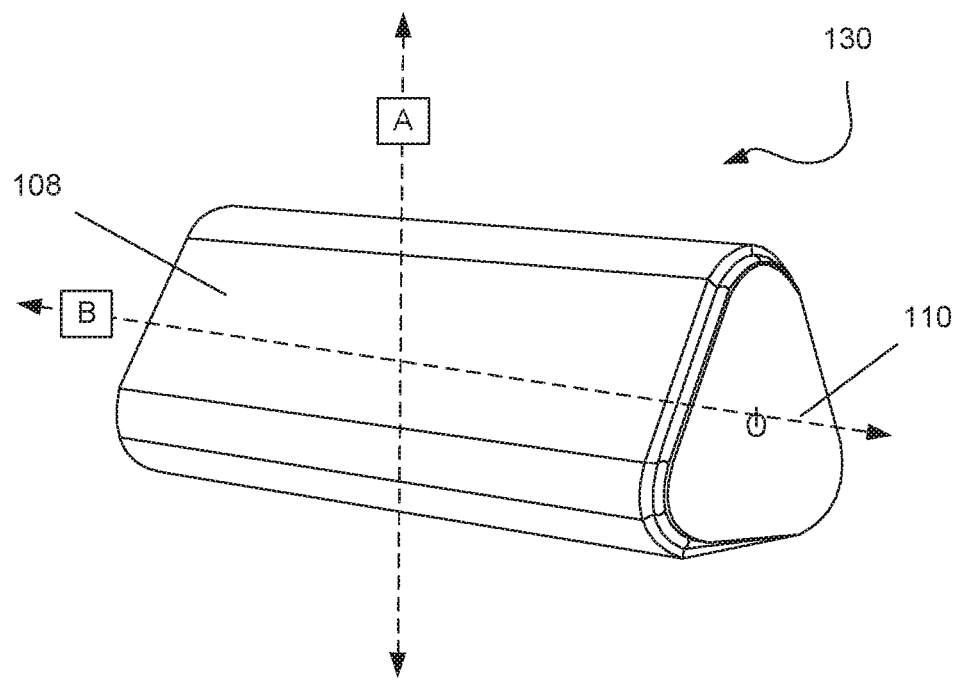
FIG. 3 is an illustration of an example portable speaker unit incorporating a portable transceiver unit consistent with the disclosed implementations.

FIG. 3 is an illustration of an example portable speaker unit incorporating a portable transceiver unit consistent with the disclosed implementations. As shown in FIG. 3, a portable speaker unit (130) including a speaker system (108). Though not shown in this figure, this unit (130) will include the microphone, wireless transceiver and motion sensor as described above in connection with FIG. 2.

With regard to the example of FIG. 3, some of the possible predetermined motion patterns will be described. As noted, these motion patterns can be detected to trigger a wake signal being sent to the host computer.

First, the portable unit (130) can be shaken, for example, side to side, in any directions to trigger a wake or other signal to the host computer. Second, the portable unit (130) may also be tapped. Impacts to the exterior of the portable unit (130) will cause vibrations detectable by the motion sensor.

Third, the portable unit (130) may be rotated. For example, the portable unit (130) may be rotated around a central vertical axis (A). Alternatively, the portable unit (130) may be rotated around a central longitudinal axis (B). In the illustrated example, the portable unit (130) has a triangular cross-section and rests one face of its triangular shape. Consequently, the portable unit (130) could be rotated or rolled onto another of its sides as a motion pattern intended to trigger a signal to the host computer. The unit may then be rolled back to its original position for subsequent use.

The illustrated portable unit (130) also has two ends (110). Thus, the portable unit (130) could be tipped onto either of its ends (110) as a motion pattern intended to trigger a signal to the host computer. The unit may then be restored to its original position for subsequent use.

Figure 4:
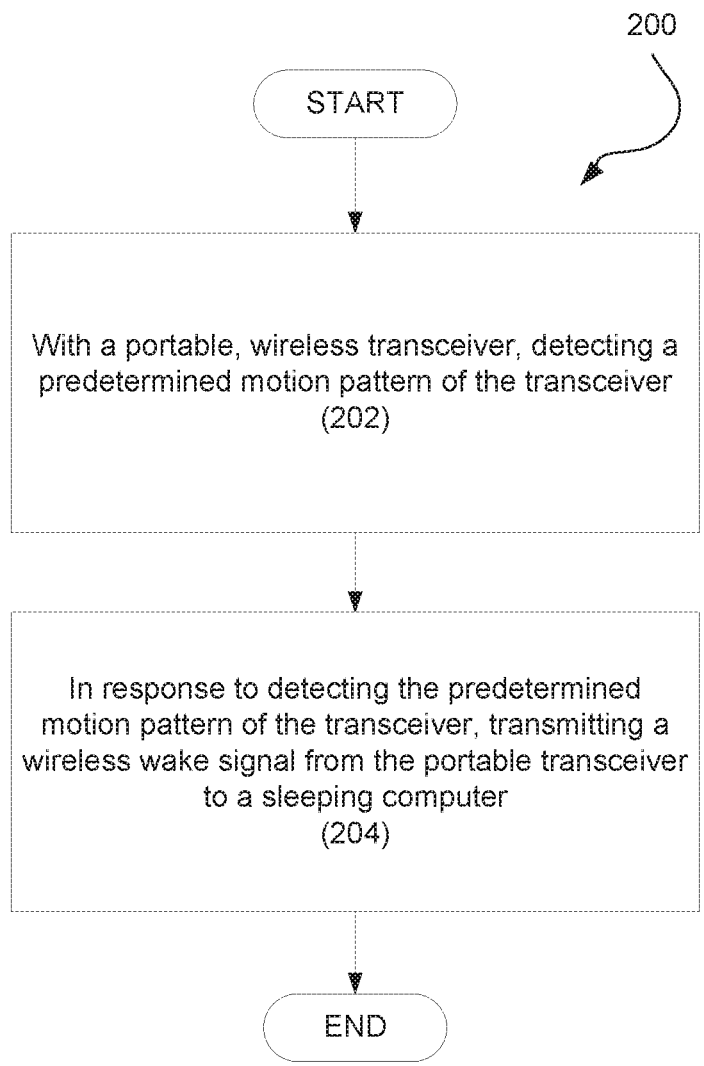
FIG. 4 is a flowchart of an example method of using a portable transceiver unit to wake a sleeping computer.

FIG. 4 is a flowchart of an example method of using a portable transceiver unit to wake a sleeping computer. As shown in FIG. 4, the present specification describes a method including: with a portable, wireless transceiver, detecting (202) a predetermined motion pattern of the transceiver; and in response to detecting the predetermined motion pattern of the transceiver, transmitting (204) a wireless wake signal from the portable transceiver to a sleeping computer.

Figure 5:
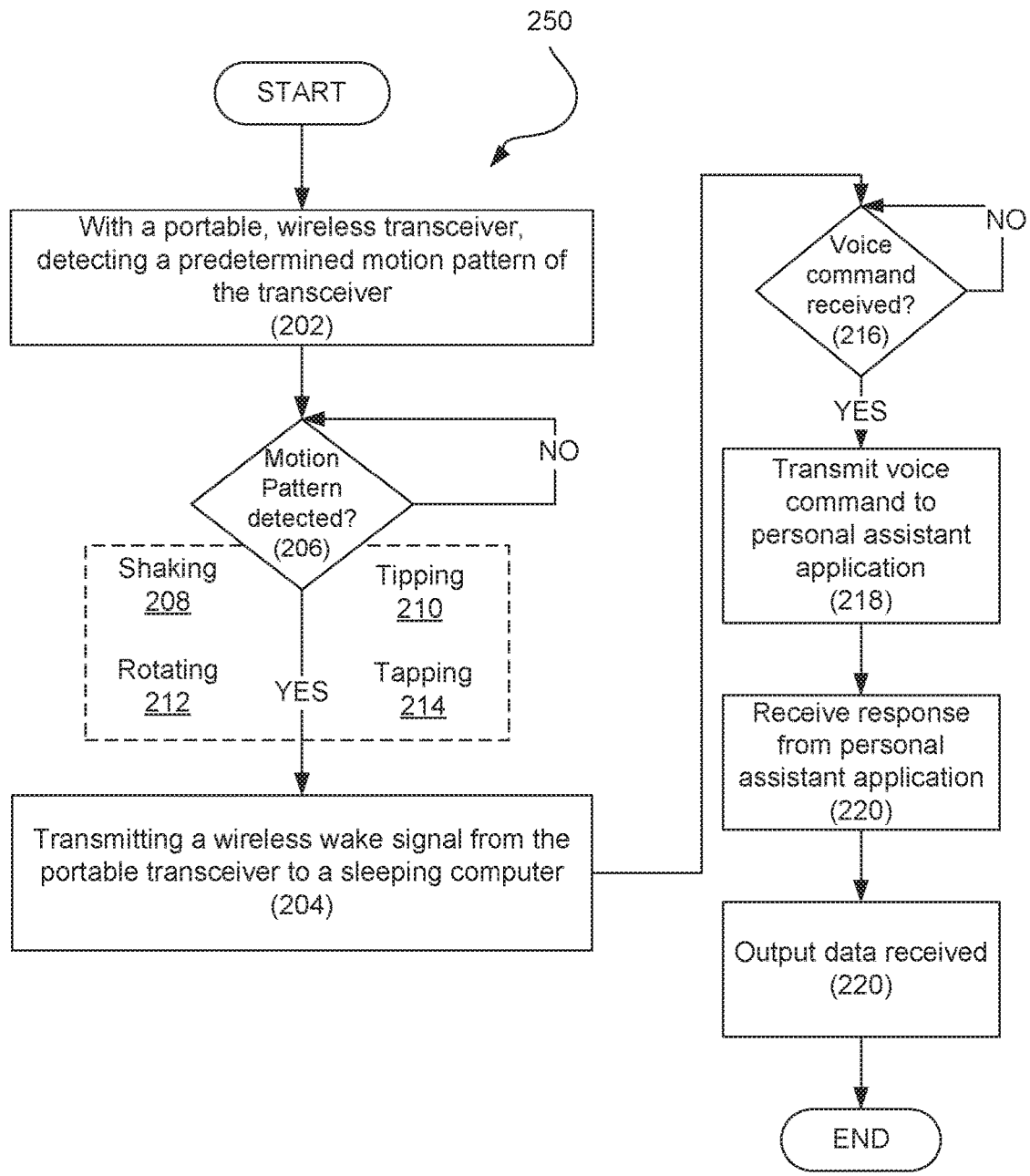
FIG. 5 is a flowchart of an example method of using a portable transceiver unit to wake a sleeping computer and interact with a personal assistant application of that computer consistent with the disclosed implementations.

FIG. 5 is a flowchart of an example method of using a portable transceiver unit to wake a sleeping computer and interact with a personal assistant application of that computer consistent with the disclosed implementations. As shown in FIG. 5, the method begins with the portable transceiver unit detecting (202) a predetermined motion pattern at the transceiver.

When motion is detected, it is determined (206) if the motion exhibits a predetermined pattern. As described above, such a pattern may include, for example, any of shaking (208), rotating (212), tipping (210) and tapping (214).

When a specific predetermined motion pattern is detected (206), the method transmits (204) a wireless wake signal from the portable transceiver unit to a sleeping host computer. Thereafter, the host computer is ready, and the portable transceiver unit awaits a voice command.

When a voice command is received (216), it is transmitted (218), for example, to a personal assistant application on the host computer. The portable transceiver then waits to receive (220) a response from the personal assistant application.

This response is then output (222). For example, the response may be an audio signal containing a verbal response to the voice command. Where this is the case, the verbal response is output using the speaker system of the portable transceiver unit, as described above.

Figure 6:
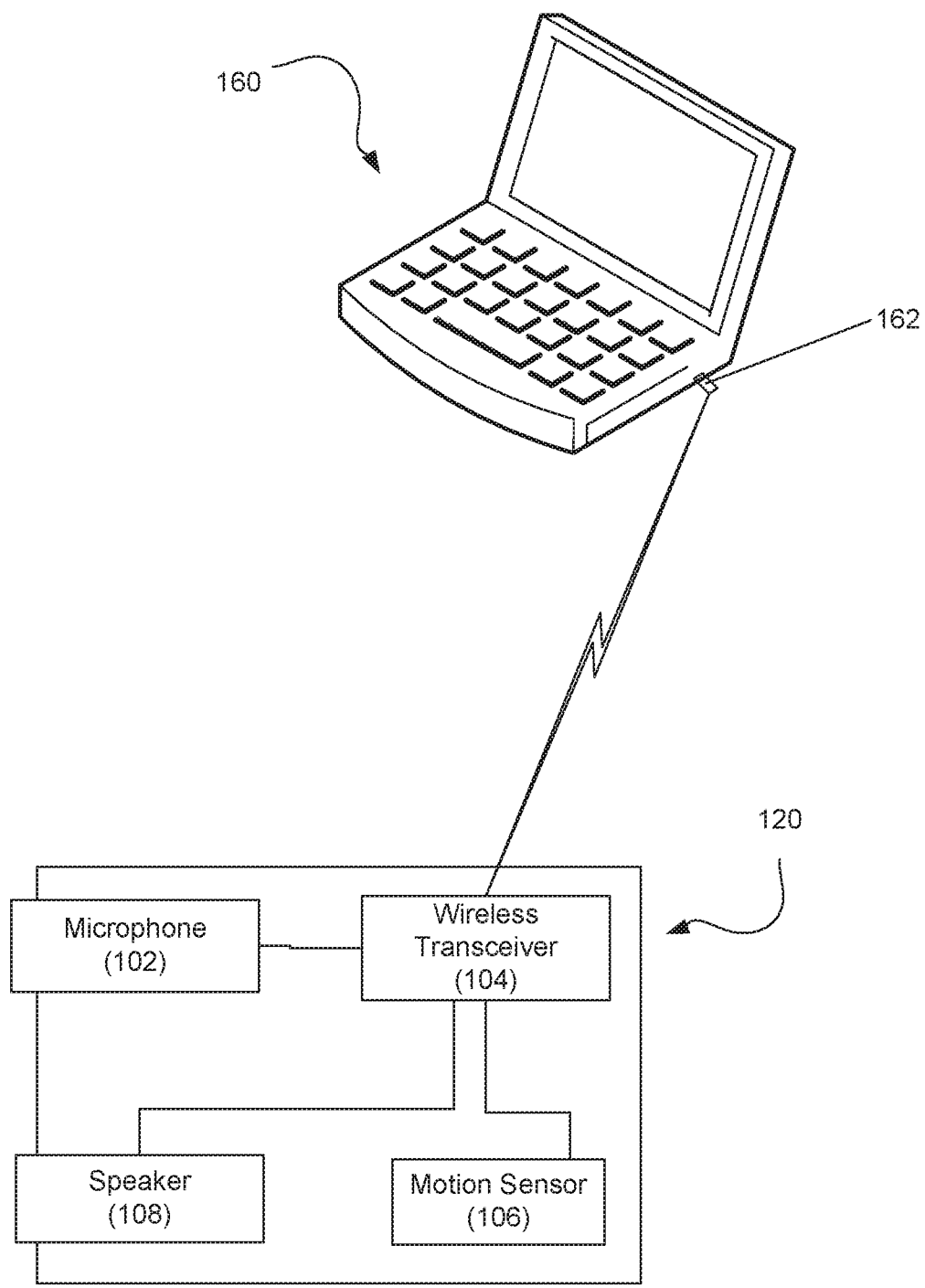
FIG. 6 is an illustration of a portable transceiver unit interacting with a remote host computer consistent with the disclosed implementations.

FIG. 6 is an illustration of a portable transceiver unit interacting with a remote host computer consistent with the disclosed implementations. As shown in FIG. 6, the portable transceiver unit (120) includes a microphone (102) wireless transceiver (104), speaker system (108) and motion sensor (106), as described above in connection with FIG. 2.

FIG. 6 also illustrates a host computer (160). As noted above, the host computer (160) could be any of a number of different computerized devices. The communication between the host computer (160) and the portable transceiver unit (120) can use any wireless protocol, for example, Bluetooth or a wireless local area network (WiFi).

In some cases the host computer (160) may not have the capability to directly interface with the portable transceiver unit (120). In such cases, or for other reasons, a dongle (162) may be provided and connected to the host computer (160).

The dongle (162) will incorporate a wireless transceiver for communication with the portable transceiver unit (120) and its wireless transceiver (104). The dongle (162) may draw power from the host computer (160) may input a wake signal from the portable transceiver unit (120) to the host computer (160). In other examples, the functionality of the dongle may already be incorporated into the host computer (160), rendering a dongle unnecessary.

In some examples, the dongle (162) may translate the wake signal from the portable transceiver unit (120) into a signal designated to wake the host computer. For example, the portable transceiver unit (120) might send a wake signal to the USB dongle (162), but depending upon how the USB dongle is treated by the host computer (160), the dongle (162) may need to convert the wake signal into some other form. Specifically, action at a keyboard or mouse can typically trigger a wake signal in a computer in a low-power state, but interaction with a speaker may not have that capability. Therefore, the dongle (162) may translate the wake signal from the portable transceiver unit (120) into something that is received by the host computer (160) as a mouse or keyboard event or the like that results in waking the computer from its low-power state.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A portable transceiver unit comprising:
    a microphone to receive a voice command from a user, the voice command designated for a personal assistant application;
    a wireless transceiver to wirelessly communicate with a computer remotely located from the portable transceiver unit, the computer to host the personal assistant application; and
    a motion sensor to:
        detect a predetermined motion pattern at the portable transceiver unit; and
        cause the wireless transceiver, in response to a signal corresponding to detection of the predetermined motion pattern by the motion sensor to:

wirelessly transmit the wake signal to the computer when in a low-power state;

wirelessly transmit a launch command to launch the personal assistant application after the computer is awakened from the low-power state; and wirelessly transmit the data of the voice command to the computer hosting the personal assistant application after the voice command is transduced by the microphone.

2. The portable transceiver unit of claim 1, further comprising a speaker to audibly output a signal received by the transceiver.

3. The portable transceiver unit of claim 1, wherein the wireless transceiver is one of a Bluetooth and WiFi transceiver.

4. The portable transceiver unit of claim 1, wherein the motion sensor comprises one of a Microelectronic Mechanical System (MEMS) motion sensor, accelerometer or gyroscope.

5. The portable transceiver unit of claim 1, wherein the predetermined motion pattern comprises shaking the portable transceiver unit.

6. The portable transceiver unit of claim 1, wherein the predetermined motion pattern comprises tipping the portable transceiver unit on end.

7. The portable transceiver unit of claim 1, wherein the predetermined motion pattern comprises rotating the portable transceiver unit.

8. The portable transceiver unit of claim 1, wherein the predetermined motion pattern comprises tapping the portable transceiver unit.

9. A method comprising:

with a portable transceiver, detecting a predetermined motion pattern of the transceiver corresponding to a trigger to transmit a wake signal to a sleeping computer; and in response to detecting the predetermined motion pattern of the transceiver corresponds to the trigger to transmit a wake signal to a sleeping computer, wirelessly transmitting a wake signal from the portable transceiver to a remotely-located computer.

10. The method of claim 9, further comprising, with the portable transceiver:

receiving, at the portable transceiver, a voice command for a personal assistant application on the remotely-located computer;

transmitting, by the portable transceiver in response to the remotely-located computer being woken up by the transmitted wake signal, the voice command wirelessly to the personal assistant application on the remotely-located computer;

receiving, at the portable transceiver, a wireless response from the personal assistant application; and with a speaker of the portable transceiver, audibly outputting data received from the personal assistant application.

11. The method of claim 10, further comprising:

converting a signal from a motion sensor to a wake signal capable of waking the remotely-located computer.

12. The method of claim 11, wherein the signal from the motion sensor is converted to a signal corresponding to a peripheral event.

13. The method of claim 10, further comprising:

transmitting a launch command to the remotely-located computer to launch the personal assistant application to be hosted by the remotely-located computer in response to the voice command made at the portable transceiver or in response to a motion pattern occurring at the portable transceiver.

14. The method of claim 9, wherein the predetermined motion pattern comprises shaking the portable transceiver unit.

15. The method of claim 9, wherein the predetermined motion pattern comprises tipping or rotating the portable transceiver unit on end.

16. The method of claim 9, wherein the predetermined motion patter comprises tapping the portable transceiver unit.

17. A remote communication system for a computer, the system comprising:

a dongle for connection to a host computer; and a portable transceiver unit, the portable transceiver unit comprising:

a microphone to receive spoken voice commands corresponding to a personal assistant application;

a wireless transceiver to wirelessly communicate with the dongle at the host computer; and a motion sensor to detect a predetermined motion pattern at the portable transceiver unit, the predetermined motion pattern corresponding to a trigger to transmit a wake signal;

wherein the wireless transceiver, in response to the motion sensor detecting the predetermined motion pattern of the transceiver, to wirelessly transmit a wake signal to the dongle at the computer.

18. The remote communication system for a computer of claim 17, wherein the dongle comprises a Universal Serial Bus (USB) connector for connection to a USB port of the host computer.

19. The remote communication system for a computer of claim 18, wherein the dongle converts the wake signal to a signal corresponding to a peripheral event capable of cause the computer to wake from a low power state.

20. The remote communication system for a computer of claim 18, wherein the dongle causes the personal assistant application to launch in response to a voice command made by the user at the portable transceiver unit and transmitted to the host computer.

* * * * *

UNITED STATES PATENT AND TRADEMARK OFFICE
CERTIFICATE OF CORRECTION

PATENT NO. : 10,477,318 B2
APPLICATION NO. : 16/087267
DATED : November 12, 2019
INVENTOR(S) : David H. Hanes Page 1 of 1

It is certified that error appears in the above-identified patent and that said Letters Patent is hereby corrected as shown below:

In Column 8, Line 24, Claim 16, delete "patter" and insert -- pattern --, therefor.

Signed and Sealed this
Eighteenth Day of February, 2020

Andrei Iancu
*Director of the United States Patent and Trademark Office*